June 5, 1928.  1,672,375
D. B. COOK ET AL
ROAD ROLLER
Filed Feb. 10, 1923  3 Sheets-Sheet 3

Inventor
DAVID B. COOK.
EDWARD F. COOKINHAM.
By their Attorneys

Patented June 5, 1928.

1,672,375

UNITED STATES PATENT OFFICE.

DAVID B. COOK AND EDWARD F. COOKINHAM, OF FRANKFORT, NEW YORK, ASSIGNORS TO ACME ROAD MACHINERY COMPANY, OF FRANKFORT, NEW YORK, A CORPORATION OF NEW YORK.

ROAD ROLLER.

Application filed February 10, 1923. Serial No. 618,209.

Our invention relates to road rollers, and has for its object to provide a road roller of novel and improved construction. It further has for its object to provide a novel and improved transmission mechanism for a road roller.

The several features of the invention will be clearly understood from the following description and accompanying drawings, in which,—

Figure 1:
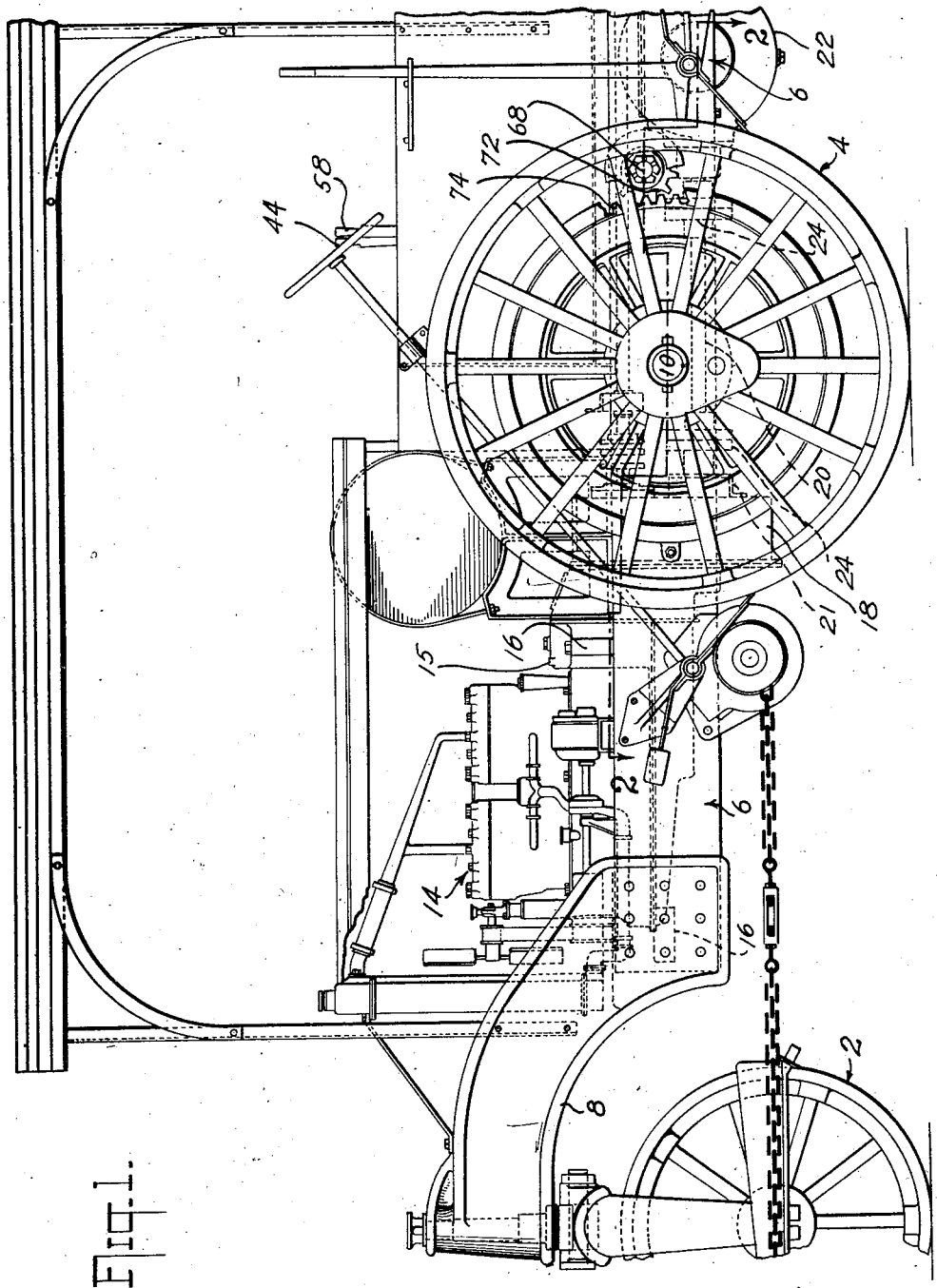
Figure 1 is a side elevation of a portion of a road roller embodying the features of the invention in their preferred form.

The road roller illustrated in the drawings is of the type having a roller 2 at the forward end of its frame, and a pair of rollers 4 arranged at opposite sides of the rear portion of its frame. As shown, the frame is made up of a pair of longitudinally extending channel irons or beams 6 that are connected together, and their forward ends are provided with an upwardly and forwardly curved extension 8, the forward end of which is connected with and supported by the front roller 2. The rollers 4 are secured on the ends of an axle 10 which extends through and is journaled in bearing blocks 12 secured on the outer sides of the frame beam 6. The motive power for the road roller illustrated in the drawings consists of a four cylinder internal combustion engine 14 of the four stroke cycle type, and a transmission mechanism of novel and improved construction and arrangement is provided which connects the crank shaft 13 of the engine with the rear axle 10. The engine is mounted on the forward portion of the roller frame with the crank shaft extending fore and aft of the frame and midway between the frame beams 6, the engine casing being provided with laterally projecting brackets 16 that are bolted to the frame beams. The rear end of the crank shaft is connected by a suitable clutch (not shown) with the forward end of a clutch shaft 17, the clutch as usual being carried by the fly wheel 19 of the engine which is contained within the rear portion 15 of the engine casing. The rear portion of the clutch shaft extends through and is journaled in bearings in the front and rear sides of a casing 18 that is bolted to the portion 15 of the engine casing, and is secured on a cross bar 21 having its ends secured to the beams 6.

Figure 3:
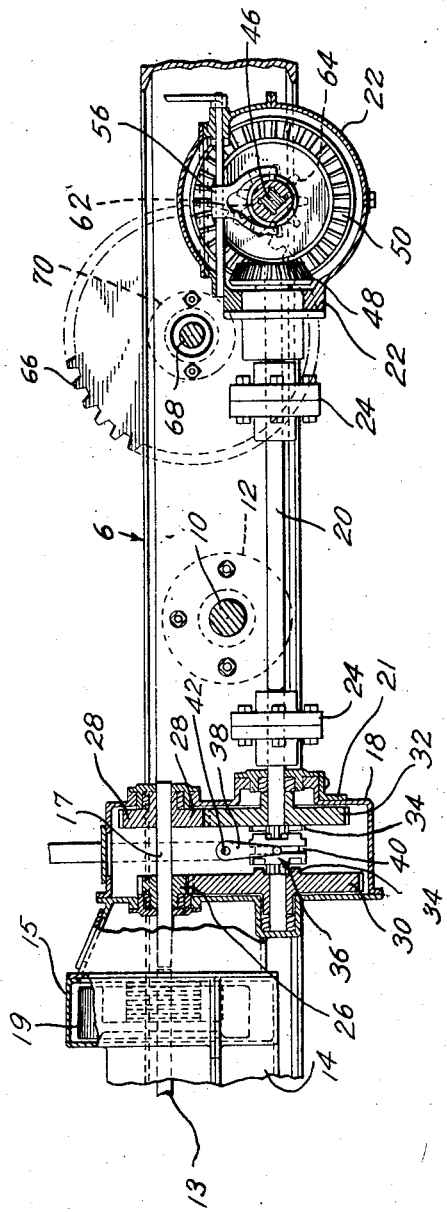
Fig. 3 is a longitudinal sectional view, partly in elevation, taken on the line 3—3 of Fig. 2.

The transmission mechanism connecting the clutch shaft with the axle 10 comprises a propeller shaft 20 which extends centrally fore and aft of the frame and is spaced a distance below the axle 10. The forward end of the propeller shaft 20 is journaled in bearings in the front and rear sides of the casing 18, and the rear end of the shaft extends through and it journaled in a bearing in the front side of a casing 22. The casing 22 is provided with laterally projecting bracket arms 23 that are secured to the frame beams 6. The propeller shaft 20 is made up of sections that are joined together by the usual universal joint connections 24. The ends of the clutch shaft 17 and the propeller shaft 20 extending within the casing 18 are connected by a manually controllable variable speed mechanism. This variable speed mechanism comprises two gears 26 and 28 that are secured on the clutch shaft adjacent the front and rear walls of the casing 18, respectively, the gear 26 being of smaller diameter than the gear 28. The gears 26 and 28 operatively engage gears 30 and 32, respectively, that are both loosely mounted on the propeller shaft 20. The inner faces of the gears 30 and 32 are each provided with clutch projections 34 that are adapted to be selectively engaged by a sliding clutch member 36 splined on the propeller shaft between the gears. With this construction it will be apparent that when the clutch member 36 is shifted forwardly, from its neutral position shown in Fig. 3, the gear 30 will be clutched to the propeller shaft and the shaft will be driven at a low speed; and that when the clutch member is shifted rearwardly into engagement with the clutch projections on the gear 32, this gear will be clutched to the propeller shaft and the shaft will be driven at a higher speed. To thus operate the clutch member 36 a clutch operating yoke 38 is provided which is connected through any suitable means (not shown) with a hand operated lever 44 arranged in a convenient position to be grasped by the operator or driver of the machine.

Figure 2:
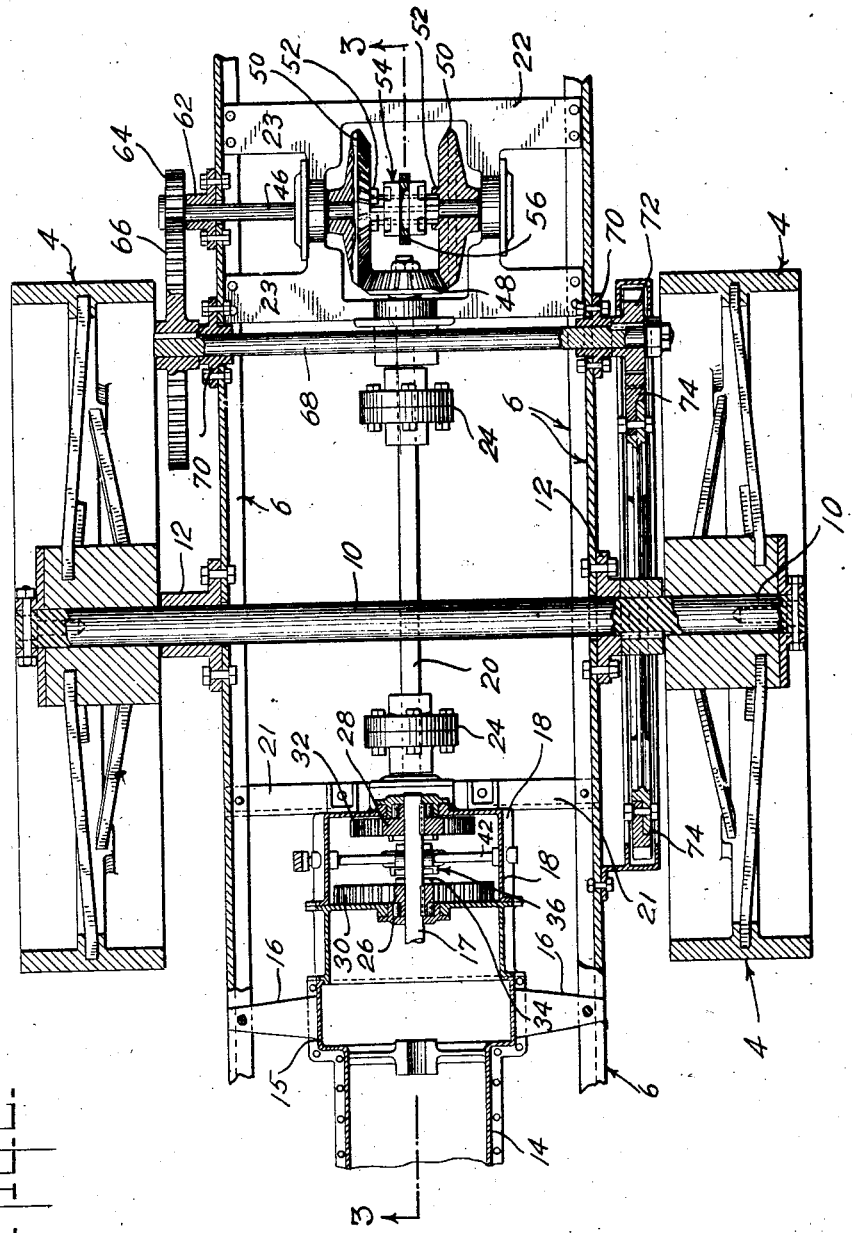
Fig. 2 is a sectional plan view taken substantially on the line 2—2 of Fig. 1.

The rear end of the propeller shaft is connected through a manually controllable reversing clutch mechanism with a transverse shaft 46 having its left end portion journaled in bearings in the sides of the casing 22. This reversing mechanism comprises a bevel pinion 48 which is secured on the rear end of the propeller shaft 20 and operatively engages bevel gears 50 that are loosely mounted on the transverse shaft 46 adjacent the side walls of the casing 22. The inner faces of the bevel gears 50 are each provided with clutch projections 52 that are adapted to be selectively engaged by a sliding clutch member 54 splined on the transverse shaft 46. With this construction it will be apparent that when the clutch member 54 is shifted from its neutral position, as shown in Fig. 2, into engagement with one of the bevel gears 50, the transverse shaft 46 will be driven in one direction; and that when the clutch member is shifted into engagement with the other gear 50 the shaft 46 will be driven in the opposite direction. The clutch member 54 is adapted to be thus operated by means of a clutch operating yoke 56 which is connected by suitable mechanism (not shown) with a hand-operated lever 58 arranged adjacent the hand operated lever 44. The right hand end of the transverse shaft 46 extends through and is journaled in a bearing block 62 bolted upon the outside of the right hand frame beam 6. The projecting end of the shaft 46 carries a small spur gear or pinion 64 that operatively engages a relatively large gear 66 which is secured on the end of a counter-shaft 68. This counter-shaft 68 extends through and is journaled in bearing blocks 70 extending through and having flanges bolted on the outer sides of the frame beams 6. The left hand end of the counter-shaft 68 carries a small spur gear or pinion 72 that operatively engages a relatively large gear 74 which is secured on the axle 10 between the left hand frame beam 6 and the adjacent roller 4.

From the foregoing it will be apparent that the transmission mechanism is simple, strong and durable in construction; that it is capable of driving the roller in either forward or reverse directions at two different speeds so that the roller may be driven at the same speeds backward as forward; that it is easily controlled by the operator or driver; and that the parts thereof are conveniently accessible for the purpose of replacement or repair. The arrangement of the engine and the parts of the transmission mechanism with relation to the body of the roller is such that the weight of the whole is so distributed that approximately two-thirds of this weight is borne by the rear axle, such distribution of weight having been found to be essential in rollers of this character to obtain the best results. Another important advantage of this arrangement is that the weight of the engine and the parts of the transmission mechanism is evenly distributed on both sides of the longitudinal center line of the roller; and the center of gravity of the body of the roller as a whole is brought to the lowest possible point, all of which contributes to the stability and efficiency of the roller, the motor and gear boxes being carried at substantially the rear axle height. Heretofore, it has been considered impracticable to employ a four-cycle multiple cylinder internal combustion engine as the motive power on a road roller, on account of the more or less complicated speed-reducing mechanism that must be employed in order to secure the required speed reduction, the principal difficulty being to provide such a mechanism that could be so arranged in the restricted space available on a road roller, particularly of the type of the one illustrated in the drawings, as to obtain the desired distribution of weight above referred to, and the desired low center of gravity, and so constructed as to enable the engine while running at full speed to pick up its load without undue strain being placed on parts of the engine or the transmission mechanism. All the gears of the transmission mechanism are in mesh at all times, speed changes being obtained by sliding jaw clutches thus avoiding clashing of gear teeth. The great speed reduction, made necessary by the use of a high speed motor, results in a more even motion being imparted to the rear wheels or rollers than is otherwise possible.

As will be evident to those skilled in the art, our invention permits of various modifications without departing from the spirit thereof or the scope of the appended claims.

What we claim is:

1. A road roller of the type having a roller at the front end of its frame, and a pair of rollers arranged at opposite sides of the rear portion of its frame having, in combination, a four cycle multiple cylinder internal combustion engine mounted on the frame between the axes of said front and rear rollers with its crank shaft extending fore and aft of the frame, and driving connections between said crank shaft and said pair of rollers comprising manually controllable variable speed mechanism arranged between said engine and the axis of said pair of rollers, manually controllable reversing clutch mechanism spaced a distance back of the axis of said pair of rollers, and connections between said reversing mechanism and said pair of rollers comprising speed reducing mechanism.

2. A road roller of the type having a roller at the front end of its frame, a pair of rollers arranged at opposite sides of the rear portion of its frame, and an axle for said pair of rollers having, in combination, a four cycle multiple cylinder internal combustion engine mounted on the frame and interposed between the axes of said front and rear rollers with its crank shaft extending fore and aft of the frame, and driving connections between said crank shaft and said pair of rollers comprising a propeller shaft extending fore and aft of the frame and spaced a distance below said axle, manually controllable variable speed mechanism interposed between and connecting the forward end of said propeller shaft with said crank shaft, manually controllable reversing mechanism connected with the rear end of said propeller shaft, and connections between said reversing mechanism and said axle comprising speed reducing gearing.

3. A road roller of the type having a roller at the front end of its frame and a pair of rollers arranged at opposite sides of the rear portion of its frame, and an axle for said pair of rollers having, in combination, a motor mounted on the frame and interposed between the axes of said front and rear rollers with its shaft extending fore and aft of the frame, and driving connections between said motor shaft and said pair of rollers comprising a propeller shaft extending fore and aft of the frame, a transverse shaft parallel with and spaced a distance back of said axle and journaled in bearings in the frame with one end projecting beyond one side of the frame, manually controllable reversing mechanism connecting said transverse shaft and the rear end of said propeller shaft, a counter-shaft mounted on the frame between said transverse shaft and said axle and journaled in bearings in the frame and having its ends projecting beyond the ends of the frame, gears connecting said projecting end of said transverse shaft with the corresponding end of said counter-shaft, and gears connecting the opposite end of said counter-shaft with said axle.

4. A road roller of the type having a roller at the front end of its frame, a pair of rollers arranged at opposite sides of the rear portion of its frame, and an axle for said pair of rollers having, in combination, a motor mounted on the frame between the axes of said front and rear rollers with its shaft extending fore and aft of the frame, and connections between said motor shaft and said pair of rollers comprising a clutch shaft extending fore and aft of the frame, a propeller shaft extending fore and aft of the frame, spaced a distance below the horizontal axis of said pair of rollers and having its forward end spaced a distance below and in substantially the same vertical plane with the rear end of the clutch shaft, a set of gears of different diameters mounted on the clutch shaft, a set of gears mounted on the forward end of the propeller shaft and meshing with said gears on the clutch shaft, respectively, one of said set of gears being fixed to its shaft and the other set of gears being loosely mounted on its shaft, and means under the control of the operator for selectively connecting the gears of said loosely mounted set of gears to its shaft.

5. A road roller of the three-wheel type having a roller on the front end of its frame, a pair of rollers arranged at opposite sides of the rear portion of its frame, and an axle for said pair of rollers, having, in combination, a four cycle multiple cylinder internal combustion engine mounted on the frame and interposed between the axes of said front and rear rollers with its crank shaft extending fore and aft of the frame, and driving connections between said crank shaft and said pair of rear rollers comprising manually controllable variable speed mechanism and manually controllable reversing mechanism arranged at opposite sides of said axle, and a propeller shaft extending fore and aft of the frame beneath the axle of said pair of rear rollers and connecting said mechanisms.

6. A road roller of the type having a roller at the front end of its frame and a pair of rollers arranged at opposite sides of the rear portion of its frame, and an axle for said pair of rollers having, in combination, a motor mounted on the frame and interposed between the axes of said front and rear rollers with its crank-shaft extending fore and aft of the frame, and driving connections between said motor shaft and said pair of rollers comprising a propeller shaft extending fore and aft of the frame, a transverse shaft parallel with and spaced a distance back of said axle and journaled in bearings in the frame, transmission mechanism connecting said transverse shaft and said propeller shaft, a counter-shaft arranged between said transverse shaft and said axle and journaled in bearings in the frame, gears connecting said transverse shaft with said counter-shaft, and gears connecting said counter-shaft with said axle.

7. A road roller of the three-wheel type having a roller on the front end of its frame, a pair of rollers arranged at opposite sides of the rear portion of its frame, and an axle for said pair of rollers, having, in combination, a four cycle multiple cylinder internal combustion engine mounted on the frame and interposed between the axes of said front and rear rollers with its crank shaft extending fore and aft of the frame, and driving connections between said crank shaft and said pair of rear rollers comprising manually controllable variable speed mechanism and manually controllable reversing mechanism arranged at opposite sides of said axle, and a propeller shaft extending fore and aft of the frame and connecting said mechanisms.

DAVID B. COOK.
EDWARD F. COOKINHAM.